(12) United States Patent
Sugishita et al.

(10) Patent No.: US 10,281,007 B2
(45) Date of Patent: May 7, 2019

(54) SPEED REDUCER

(71) Applicant: Nidec Shimpo Corporation, Nagaokakyo-shi, Kyoto (JP)

(72) Inventors: Kenji Sugishita, Nagaokakyo (JP); Taihei Tsubone, Nagaokakyo (JP); Yuji Maeguchi, Nagaokakyo (JP)

(73) Assignee: NIDEC SHIMPO CORPORATION, Kyoto (JP)

( * ) Notice: Subject to any disclaimer, the term of this patent is extended or adjusted under 35 U.S.C. 154(b) by 69 days.

(21) Appl. No.: 15/473,658

(22) Filed: Mar. 30, 2017

(65) Prior Publication Data
US 2017/0314644 A1 Nov. 2, 2017

Related U.S. Application Data

(60) Provisional application No. 62/291,233, filed on Feb. 4, 2016.

(30) Foreign Application Priority Data

Jun. 21, 2016 (JP) .................................. 2016-122963

(51) Int. Cl.
*F16H 1/32* (2006.01)

(52) U.S. Cl.
CPC ......... *F16H 1/32* (2013.01); *F16H 2001/325* (2013.01); *F16H 2001/327* (2013.01)

(58) Field of Classification Search
CPC . F16H 1/32; F16H 2001/325; F16H 2001/327
(Continued)

(56) References Cited

U.S. PATENT DOCUMENTS 3,602,070 A * 8/1971 Verge .................. F16H 1/32
475/176
4,898,065 A * 2/1990 Ogata .................. F16H 1/32
475/162
(Continued)

FOREIGN PATENT DOCUMENTS

JP 2007-078010 A 3/2007
JP 2009-127700 A 6/2009

*Primary Examiner* — Leslie A Nicholson, III
(74) *Attorney, Agent, or Firm* — Keating & Bennett, LLP (57) ABSTRACT

A speed reducer includes an input shaft member including a sun rotor arranged to rotate about a central axis; one or more planetary rolling elements each of which is supported to be capable of rotating around the sun rotor; a tubular eccentric shaft including an outer circumferential surface eccentric with respect to the central axis, and arranged to rotate about the central axis along with the rotation of the one or more planetary rolling elements; an eccentric oscillating gear including a plurality of external teeth in an outer circumferential surface thereof, and supported by the eccentric shaft through a first bearing; a housing including internal teeth arranged to mesh with the external teeth of the eccentric oscillating gear in an inner circumferential surface thereof; an output flange arranged to rotate about the central axis together with the eccentric oscillating gear, and including an eccentric oscillating carrier pin arranged to pass through the eccentric oscillating gear in an axial direction; and one or more second bearings arranged radially between an inner circumferential surface of the eccentric shaft and the input shaft member.

9 Claims, 4 Drawing Sheets

(58) Field of Classification Search
USPC .................... 475/162, 168, 169, 178, 179
See application file for complete search history.

(56) References Cited

U.S. PATENT DOCUMENTS

| | | | | |
|---|---|---|---|---|
| 5,123,882 A * | 6/1992 | Baranyi | ................... | F16H 1/32 |
| | | | | 475/177 |
| 5,226,859 A * | 7/1993 | Pires | ................... | F16H 29/02 |
| | | | | 475/169 |
| 6,440,030 B1 * | 8/2002 | Minegishi | ................... | F16H 1/32 |
| | | | | 475/178 |
| 6,679,801 B2 * | 1/2004 | Nohara | ................... | F16H 1/32 |
| | | | | 184/6.12 |
| 6,761,660 B2 * | 7/2004 | Lim | ................... | F16H 1/32 |
| | | | | 475/162 |
| 7,641,579 B2 * | 1/2010 | Junkers | ................... | F16H 1/32 |
| | | | | 475/178 |
| 7,785,223 B2 * | 8/2010 | Haga | ................... | F16H 1/32 |
| | | | | 475/162 |
| 8,022,564 B2 * | 9/2011 | Nohara | ................... | F03D 7/0204 |
| | | | | 290/44 |
| 8,827,052 B2 * | 9/2014 | Yu | ................... | B60T 13/746 |
| | | | | 180/65.51 |
| 9,145,934 B2 * | 9/2015 | Kim | ................... | B60T 13/741 |

* cited by examiner

SPEED REDUCER

CROSS REFERENCE TO RELATED APPLICATIONS

This application claims the benefit of priority to U.S. Patent Application No. 62/291,233 filed on Feb. 4, 2016 and claims the benefit of priority to Japanese Patent Application No. 2016-122963 filed on Jun. 21, 2016. The entire contents of each of these applications are hereby incorporated herein by reference.

BACKGROUND OF THE INVENTION

1. Field of the Invention

The present invention relates to a speed reducer.

2. Description of the Related Art

A combination speed reducer that achieves a speed reduction with a high reduction ratio in multiple steps using a combination of a planetary gear speed reduction mechanism and an eccentrically oscillating speed reducer has been known. Such a known combination speed reducer is described in, for example, JP-A 2007-78010.

However, the combination speed reducer described in JP-A 2007-78010 has a complicated structure, with the planetary gear speed reduction mechanism and the eccentrically oscillating speed reducer being arranged at positions away from each other, and it is difficult to reduce the size of the combination speed reducer. Moreover, no bearing is arranged between a sun gear of the planetary gear speed reduction mechanism and a crankshaft of the eccentrically oscillating speed reducer, and it is difficult to cause centers of rotation thereof to coincide with each other. This may lead to a deterioration in rotational accuracy and an increase in wear.

SUMMARY OF THE INVENTION

A speed reducer according to a preferred embodiment of the present invention includes an input shaft member including a sun rotor arranged to rotate about a central axis; one or more planetary rolling elements each of which is supported to be capable of rotating around the sun rotor; a tubular eccentric shaft including an outer circumferential surface eccentric with respect to the central axis, and arranged to rotate about the central axis along with the rotation of the one or more planetary rolling elements; an eccentric oscillating gear including a plurality of external teeth in an outer circumferential surface thereof, and supported by the eccentric shaft through a first bearing; a housing including internal teeth arranged to mesh with the external teeth of the eccentric oscillating gear in an inner circumferential surface thereof; an output flange arranged to rotate about the central axis together with the eccentric oscillating gear, and including an eccentric oscillating carrier pin arranged to pass through the eccentric oscillating gear in an axial direction; and one or more second bearings arranged radially between an inner circumferential surface of the eccentric shaft and the input shaft member.

In the above preferred embodiment of the present invention, a bearing is arranged between the sun rotor of a planetary gear speed reduction mechanism and the eccentric shaft of an eccentrically oscillating speed reducer to increase precision with which members of the speed reducer are arranged. This contributes to reducing wear and damage of the members of the speed reducer.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Hereinafter, preferred embodiments of the present invention will be described with reference to the accompanying drawings. It is assumed herein that a direction parallel to a central axis of an input shaft member or a sun rotor is referred to by the term "axial direction", "axial", or "axially", that directions perpendicular to the central axis are each referred to by the term "radial direction", "radial", or "radially", and that a direction along a circular arc centered on the central axis is referred to by the term "circumferential direction", "circumferential", or "circumferentially". Note, however, that the term "parallel" as used above includes both "parallel" and "substantially parallel". Also note that the term "perpendicular" as used above includes both "perpendicular" and "substantially perpendicular". In the following description, the right side and the left side in FIGS. 1 and 4 will be referred to as an "input side" and an "output side", respectively, for the sake of convenience in description.

Figure 1:
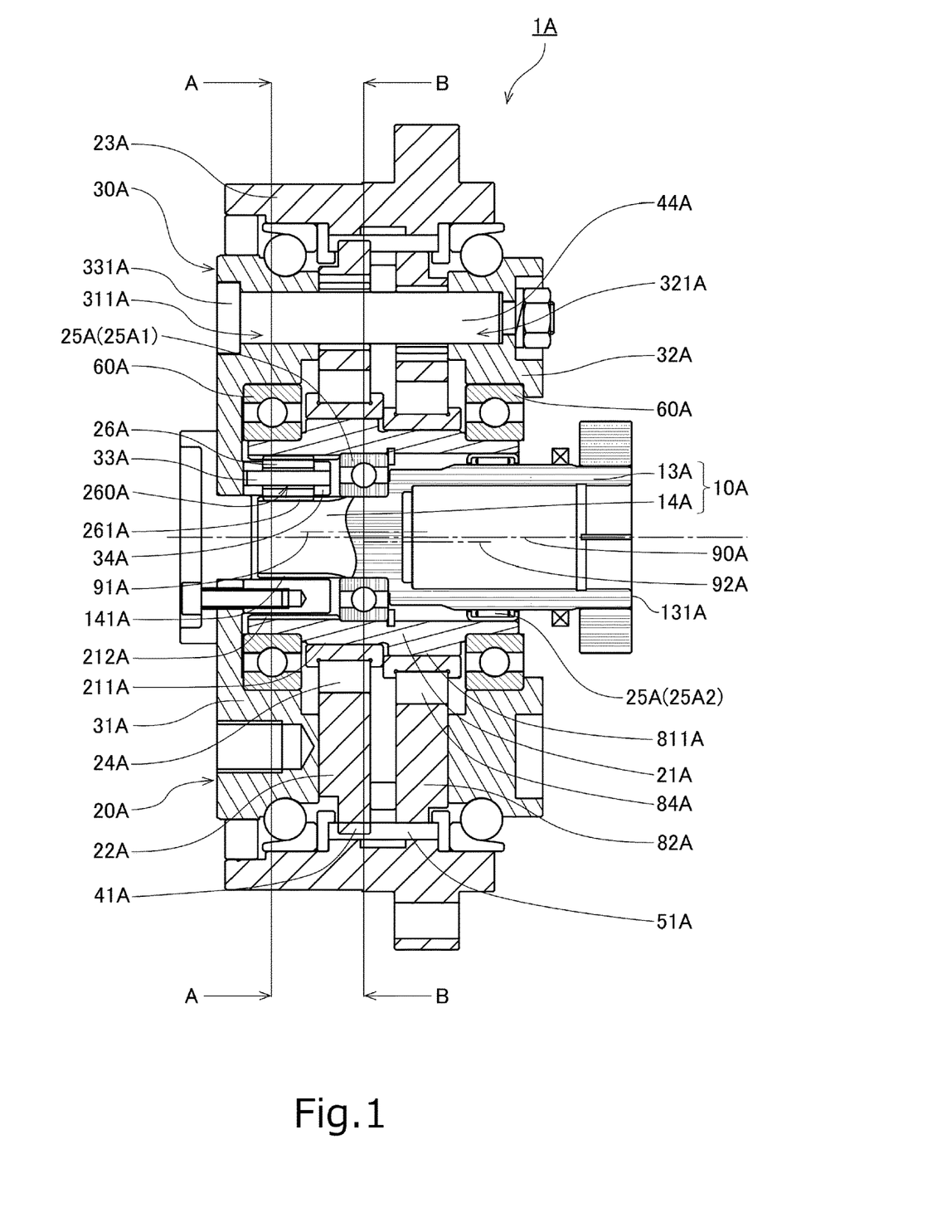
FIG. 1 is a vertical sectional view of a speed reducer according to a preferred embodiment of the present invention.
Figure 2:
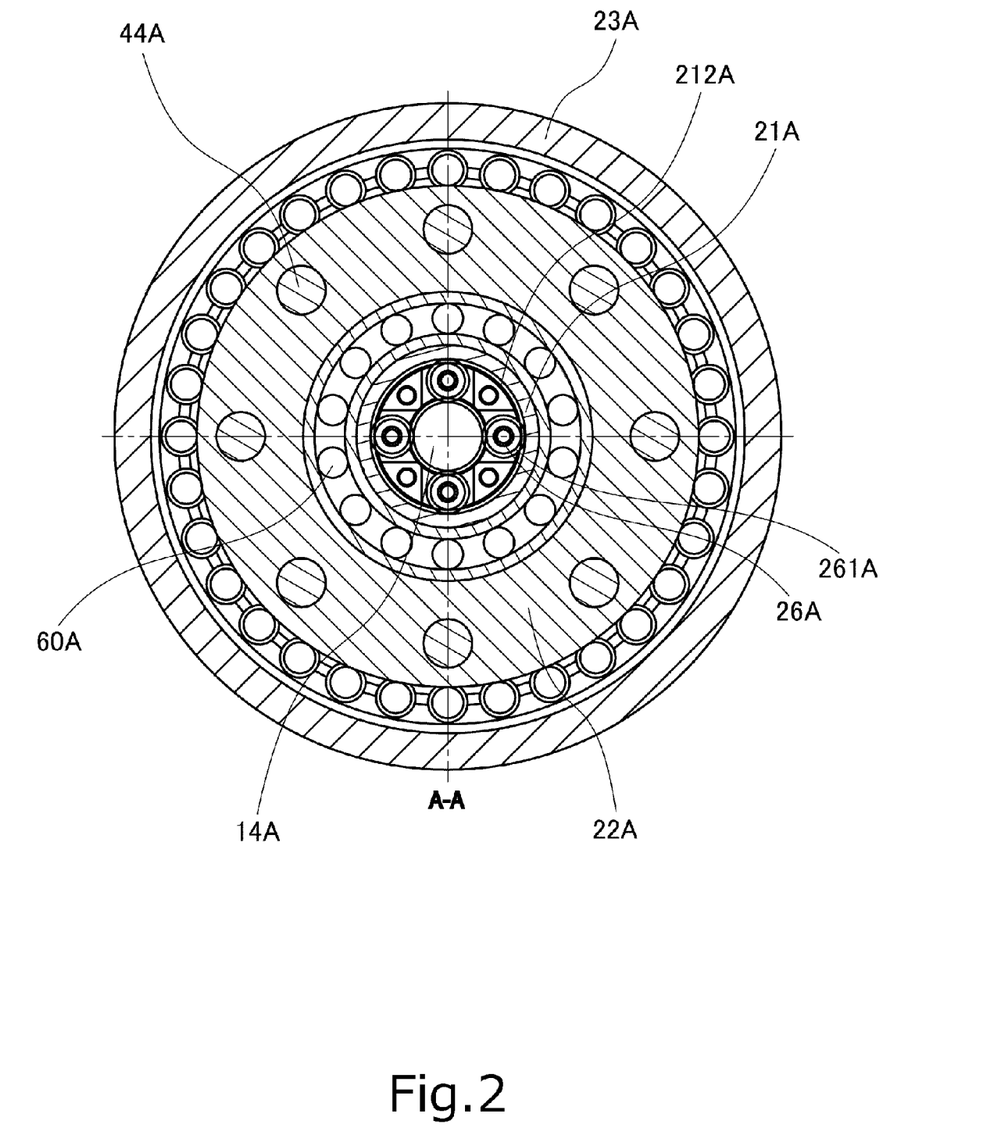
FIG. 2 is a horizontal sectional view of the speed reducer according to a preferred embodiment of the present invention.
Figure 3:
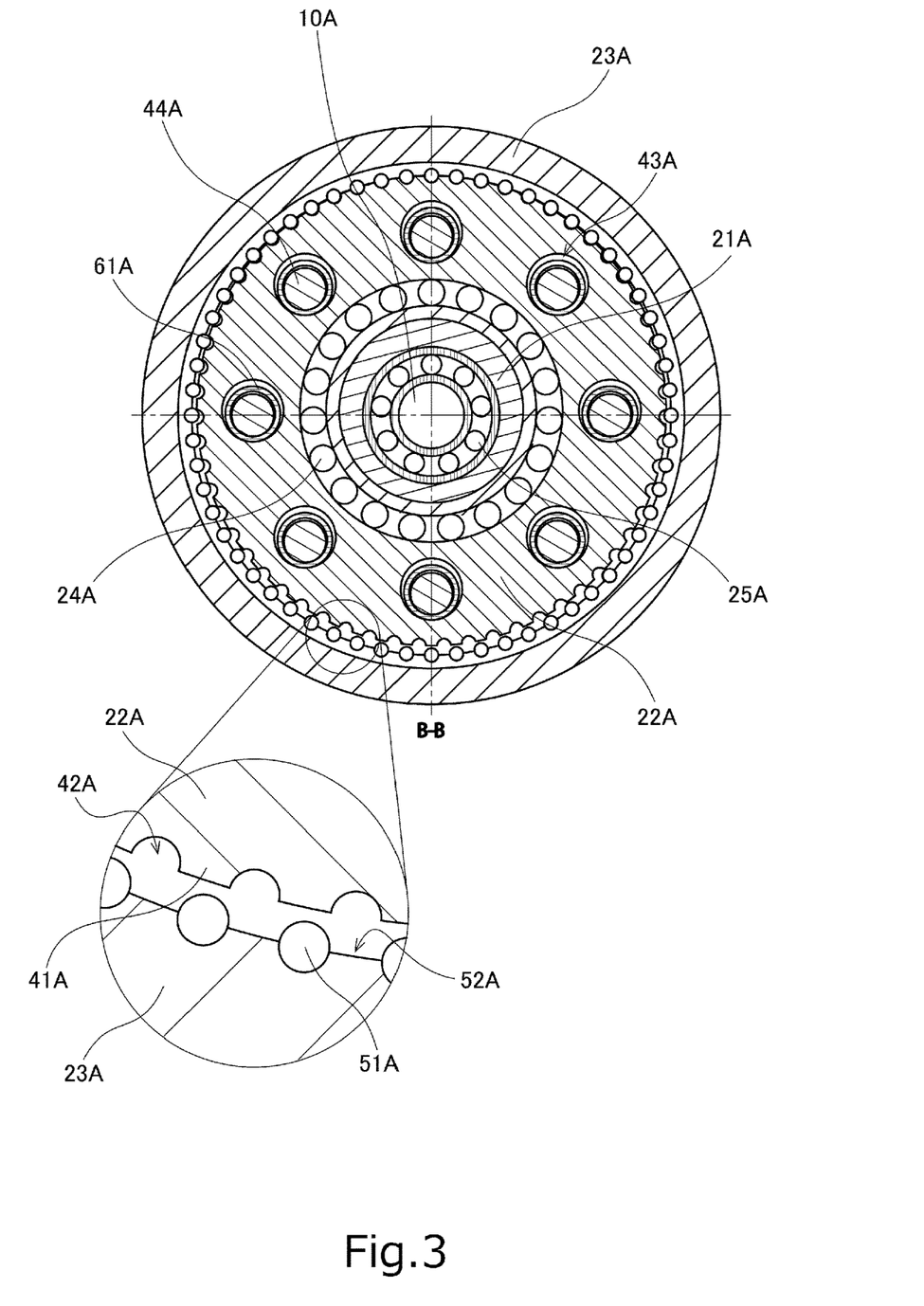
FIG. 3 is a horizontal sectional view of the speed reducer according to a preferred embodiment of the present invention.

FIG. 1 is a vertical sectional view of a speed reducer 1A according to a first preferred embodiment of the present invention taken along a plane including a central axis 90A. FIG. 2 is a horizontal sectional view of the speed reducer 1A taken along line A-A in FIG. 1. FIG. 3 is a horizontal sectional view of the speed reducer 1A taken along line B-B in FIG. 1.

The speed reducer 1A is an apparatus that converts rotational motion at a first rotation rate obtained from an external electric motor (not shown) or the like to rotational motion at a rotation rate lower than the first rotation rate in two steps, and causes an output flange 30A to rotate at the rotation rate lower than the first rotation rate. The speed reducer 1A is, for example, installed in a joint portion of an arm of a work robot to realize bending and stretching of the arm. Note that electric motor-attached speed reducers including speed reducers according to preferred embodiments of the present invention may be installed in other devices, such as, for example, a powered exoskeleton, a turntable, an index plate of a machine tool, a wheelchair, and an automated guided vehicle, to realize various types of rotational motion.

As illustrated in FIG. 1, the speed reducer 1A according to the present preferred embodiment includes an input shaft member 10A, a speed reduction mechanism 20A, and the output flange 30A.

The input shaft member 10A is a member that rotates at the first rotation rate, which is a rotation rate inputted from an outside. The input shaft member 10A according to the present preferred embodiment includes an input shaft 13A and a sun rotor 14A. The input shaft 13A is a cylindrical member arranged to extend along the central axis 90A. An input-side end portion 131A of the input shaft 13A is connected to a motor that serves as a driving source directly or through another power transmission mechanism. Once the motor is driven, the input shaft member 10A is caused to rotate about the central axis 90A at the first rotation rate.

The sun rotor 14A is arranged to rotate about the central axis 90A together with the input shaft 13A. The sun rotor 14A includes a plurality of sun teeth 141A arranged to project radially outward.

The speed reduction mechanism 20A is a mechanism arranged between the input shaft member 10A and the output flange 30A to transfer the rotational motion of the input shaft member 10A to the output flange 30A while reducing the speed thereof in two steps. The speed reduction mechanism 20A according to the present preferred embodiment includes a plurality of planetary rolling elements 26A, an eccentric shaft 21A, eccentric oscillating gears (a first eccentric oscillating gear 22A and a second eccentric oscillating gear 82A), and a housing 23A.

The planetary rolling elements 26A are arranged at regular intervals around the sun rotor 14A. Each planetary rolling element 26A includes an insert hole 260A in a center thereof. A planetary carrier pin 33A is inserted in the insert hole 260A. Each planetary rolling element 26A is supported by the planetary carrier pin 33A to be capable of rotating and revolving around the sun rotor 14A. The planetary carrier pins 33A are included in a planetary carrier 34A disposed on the output side. Further, the planetary carrier 34A is fixed to the output flange 30A, which will be described below, through bolts or the like. In addition, an outer circumferential portion of each planetary rolling element 26A includes a plurality of planetary teeth 261A arranged to mesh with the sun teeth 141A of the sun rotor 14A. Accordingly, rotation of the sun rotor 14A causes each planetary rolling element 26A to rotate in a direction opposite to a direction in which the input shaft member 10A and the sun rotor 14A rotate. Note that, although the speed reducer 1A according to the present preferred embodiment includes four planetary rolling elements 26A as illustrated in FIG. 2, the number of planetary rolling elements 26A may alternatively be one, two, three, or more than four. Also note that the planetary rolling elements 26A may alternatively be arranged at irregular intervals around the sun rotor 14A.

The eccentric shaft 21A is a tubular member arranged radially outward of the planetary rolling elements 26A, and including an outer circumferential surface which is eccentric with respect to the central axis 90A. An inner circumferential portion of the eccentric shaft 21A defines an internal ring in the shape of a circular ring, including a contact surface arranged to make contact with the planetary rolling elements 26A, and including a plurality of internal teeth 212A arranged to mesh with the planetary teeth 261A. That is, the planetary teeth 261A of each of the planetary rolling elements 26A constantly mesh with both the sun teeth 141A of the sun rotor 14A and the internal teeth 212A of the eccentric shaft 21A. The eccentric shaft 21A receives power from the planetary rolling elements 26A through the internal ring including the internal teeth 212A. As described above, once the sun rotor 14A rotates, each of the planetary rolling elements 26A rotates about the planetary carrier pin 33A. Accordingly, the eccentric shaft 21A slowly rotates about the central axis 90A at a second rotation rate lower than the first rotation rate of the input shaft member 10A and the sun rotor 14A in the direction opposite to the direction in which the input shaft member 10A and the sun rotor 14A rotate.

Note that "helical gears", for example, are used as the sun rotor 14A, the planetary rolling elements 26A, and the internal ring of the eccentric shaft 21A. Note, however, that members having structures other than those of the "helical gears", such as, for example, "spur gears" or "traction rollers", may alternatively be used as the sun rotor 14A, the planetary rolling elements 26A, and the internal ring of the eccentric shaft 21A.

The first eccentric oscillating gear 22A is attached to an eccentric outer circumferential surface 211A of the eccentric shaft 21A through a first bearing 24A. Therefore, the first eccentric oscillating gear 22A is supported to be rotatable about a first central axis 91A, which is a center of the eccentric outer circumferential surface 211A of the eccentric shaft 21A. Similarly, the second eccentric oscillating gear 82A is attached to an eccentric outer circumferential surface 811A of the eccentric shaft 21A through a first bearing 84A. Therefore, the second eccentric oscillating gear 82A is supported to be rotatable about a second central axis 92A, which is a center of the eccentric outer circumferential surface 811A of the eccentric shaft 21A. Note that, although the speed reducer 1A illustrated in FIG. 1 includes two eccentric oscillating gears, the number of eccentric oscillating gears is not limited to two.

As illustrated in an enlarged view in FIG. 3, the first eccentric oscillating gear 22A includes a plurality of external teeth 41A arranged to project radially outward in an outer circumferential surface thereof. In addition, an external tooth space 42A, which is recessed radially inward, is defined between adjacent ones of the external teeth 41A. The external teeth 41A and the external tooth spaces 42A are arranged alternately in a circumferential direction about the first central axis 91A. In addition, similarly to the first eccentric oscillating gear 22A, the second eccentric oscillating gear 82A includes a plurality of external teeth (not shown) and a plurality of external tooth spaces (not shown) in an outer circumferential portion thereof.

In addition, the first eccentric oscillating gear 22A includes a plurality of insert holes 43A. The insert holes 43A are arranged at regular intervals in the circumferential direction about the first central axis 91A. Each insert hole 43A is arranged to pass through the first eccentric oscillating gear 22A in an axial direction, radially inside of the external teeth 41A and the external tooth spaces 42A. Note that, although the speed reducer 1A illustrated in FIG. 3 includes eight insert holes 43A, the number of insert holes 43A is not limited to eight. Similarly to the first eccentric oscillating gear 22A, the second eccentric oscillating gear 82A also includes a plurality of insert holes 43A.

The housing 23A is a substantially cylindrical member arranged to house the input shaft member 10A, the planetary rolling elements 26A, the eccentric shaft 21A, the eccentric oscillating gears (i.e., the first eccentric oscillating gear 22A and the second eccentric oscillating gear 82A), and the output flange 30A therein. As illustrated in the enlarged view in FIG. 3, the housing 23A includes a plurality of internal teeth 51A arranged to project radially inward in an inner circumferential surface thereof. In addition, an internal tooth space 52A, which is recessed radially outward, is defined between adjacent ones of the internal teeth 51A. The internal teeth 51A and the internal tooth spaces 52A are arranged alternately in a circumferential direction about the central axis 90A.

The external teeth 41A of the first eccentric oscillating gear 22A and the internal teeth 51A of the housing 23A are arranged to mesh with each other. That is, when the speed reducer 1A is in operation, the first eccentric oscillating gear 22A rotates while the external teeth 41A of the first eccentric oscillating gear 22A are fitted in the internal tooth spaces 52A of the housing 23A, and the internal teeth 51A of the housing 23A are fitted in the external tooth spaces 42A of the first eccentric oscillating gear 22A. Similarly, the external teeth (not shown) of the second eccentric oscillating gear 82A and the internal teeth 51A of the housing 23A are arranged to mesh with each other. In the present preferred embodiment, the housing 23A thus serves as an internal gear. Note that an internal gear separate from the housing 23A may alternatively be arranged on an inner circumferential portion of the housing 23A.

Each of the first and second eccentric oscillating gears 22A and 82A rotates by meshing with the internal teeth 51A of the housing 23A while revolving around the central axis 90A through the planetary rolling elements 26A and the eccentric shaft 21A due to power from the input shaft member 10A. Here, the number of internal teeth 51A of the housing 23A is greater than the number of external teeth 41A of the first eccentric oscillating gear 22A. Therefore, with each revolution of the first eccentric oscillating gear 22A, the position of the external tooth 41A that meshes with the same internal tooth 51A of the housing 23A shifts. Thus, the first eccentric oscillating gear 22A slowly rotates at a third rotation rate lower than the second rotation rate in a direction opposite to a direction in which the eccentric shaft 21A rotates, that is, in the same direction as the rotation direction of the input shaft member 10A and the sun rotor 14A. Accordingly, the position of each insert hole 43A of the first eccentric oscillating gear 22A also slowly rotates at the third rotation rate. Similarly, the second eccentric oscillating gear 82A slowly rotates at the third rotation rate lower than the second rotation rate in the direction opposite to the direction in which the eccentric shaft 21A rotates, that is, in the same direction as the rotation direction of the input shaft member 10A and the sun rotor 14A.

If the number of external teeth 41A of the first eccentric oscillating gear 22A is denoted by N, and the number of internal teeth 51A of the housing 23A is denoted by M, a reduction ratio P is given by P=(second rotation rate)/(third rotation rate)=N/(M−N). In the example of FIG. 3, N=59 and M=60, and therefore, the reduction ratio in this example is P=59. That is, the third rotation rate is equal to 1/59 times the second rotation rate. Note that the reduction ratio of a speed reduction mechanism according to another preferred embodiment of the present invention may have another value. The number of external teeth (not shown) of the second eccentric oscillating gear 82A is equal to the number of external teeth 41A of the first eccentric oscillating gear 22A.

As illustrated in FIGS. 1 and 3, a plurality of second bearings 25A are further arranged radially between an inner circumferential surface of the eccentric shaft 21A and the input shaft member 10A. This contributes to increasing precision with which each member of the speed reducer 1A is arranged. This in turn contributes to stabilizing rotation of the eccentric shaft 21A and each eccentric oscillating gear, and reducing wear and damage of each member, and also contributes to extending the life of the speed reducer 1A.

Note that, although the speed reducer 1A illustrated in FIG. 1 includes two second bearings 25A, the number of second bearings 25A may alternatively be one or more than two.

At least one of the plurality of second bearings 25A (a second bearing 25A1 in FIG. 1) is preferably a ball bearing. In the case where the "helical gear" is used as each of the planetary rolling elements 26A as described above, an axial load occurs. In this case, use of the ball bearing leads to easier absorption of the axial load. In addition, at least one of the second bearings 25A (a second bearing 25A2 in FIG. 1) is preferably a needle bearing. This contributes to reducing the radial dimension of the speed reducer 1A.

Further, as illustrated in FIG. 1, at least one of the plurality of second bearings 25A of the speed reducer 1A is arranged to radially overlap with the eccentric outer circumferential surface 211A of the eccentric shaft 21A. This contributes to reducing the axial and radial dimensions of the speed reducer 1A.

The output flange 30A includes a first disk 31A, a second disk 32A, and a plurality of eccentric oscillating carrier pins 44A arranged to pass through the eccentric oscillating gears (i.e., the first and second eccentric oscillating gears 22A and 82A) in the axial direction.

The first disk 31A is a member in the shape of a circular ring and arranged to be perpendicular to the central axis 90A. The first disk 31A is arranged on the output side of the first and second eccentric oscillating gears 22A and 82A.

A third bearing 60A is further arranged radially between the eccentric shaft 21A and the first disk 31A of the output flange 30A. This contributes to further increasing the precision with which the output flange 30A is arranged in the speed reducer 1A. This in turn contributes to stabilizing rotation of the output flange 30A, and further reducing the wear and damage of each member, and also contributes to further extending the life of the speed reducer 1A.

In addition, the first disk 31A includes a plurality of (eight in the present preferred embodiment) press-fit holes 311A in which the eccentric oscillating carrier pins 44A are press fitted. The press-fit holes 311A are arranged at regular intervals in the circumferential direction about the central axis 90A. Each press-fit hole 311A is arranged to pass through the first disk 31A in the axial direction.

The second disk 32A is a member in the shape of a circular ring and arranged to be perpendicular to the central axis 90A. The second disk 32A is arranged on the input side of the first and second eccentric oscillating gears 22A and 82A.

A third bearing 60A is arranged radially between the eccentric shaft 21A and the second disk 32A of the output flange 30A. This contributes to further increasing the precision with which the output flange 30A is arranged in the speed reducer 1A. This in turn contributes to stabilizing the rotation of the output flange 30A, and further reducing the wear and damage of each member, and also contributes to further extending the life of the speed reducer 1A. Note that, although the speed reducer 1A illustrated in FIG. 1 includes two third bearings 60A, the number of third bearings 60A may alternatively be one or more than two.

In addition, the second disk 32A includes a plurality of (eight in the present preferred embodiment) fixing holes 321A in which input-side end portions of the eccentric oscillating carrier pins 44A are inserted. The fixing holes 321A are arranged at regular intervals in the circumferential direction about the central axis 90A. Each fixing hole 321A is arranged to pass through the second disk 32A in the axial direction.

Each of the plurality of (eight in the present preferred embodiment) eccentric oscillating carrier pins 44A is a columnar member arranged to connect the first and second disks 31A and 32A to each other. Each eccentric oscillating carrier pin 44A is arranged to be parallel or substantially parallel to the central axis 90A. The eccentric oscillating carrier pins 44A are press fitted in the respective press-fit holes 311A of the first disk 31A, and are inserted through the respective insert holes 43A of each of the first and second eccentric oscillating gears 22A and 82A. In addition, a coming-off preventing portion 331A having an increased diameter is arranged at an output-side end portion of each eccentric oscillating carrier pin 44A. The coming-off preventing portion 331A is arranged to be in axial contact with the first disk 31A. Each eccentric oscillating carrier pin 44A is thus prevented from coming off to the input side. In addition, the input-side end portion of each eccentric oscillating carrier pin 44A is inserted in the corresponding fixing hole 321A of the second disk 32A, and is fixed to the second disk 32A through a nut or the like.

As illustrated in FIG. 3, there is a gap between a surface defining each insert hole 43A and an outer circumferential surface of the eccentric oscillating carrier pin 44A. A bushing ring 61A in the shape of a circular ring is inserted in this gap. Once each of the first and second eccentric oscillating gears 22A and 82A rotates at the third rotation rate, which results from a speed reduction, power of the rotation is transferred to each eccentric oscillating carrier pin 44A through the bushing ring 61A. As a result, the eccentric oscillating carrier pins 44A and the output flange 30A, which includes the eccentric oscillating carrier pins 44A, rotate about the central axis 90A at the third rotation rate together with the two eccentric oscillating gears.

Further, the planetary carrier 34A, which is fixed to the output flange 30A, and the planetary carrier pins 33A, which are included in the planetary carrier 34A, rotate about the central axis 90A along with the rotation of the output flange 30A. Accordingly, the planetary rolling elements 26A, which are supported by the planetary carrier pins 33A, revolve around the central axis 90A. That is, the planetary rolling elements 26A revolve around the central axis 90A while rotating by receiving power through the sun rotor 14A or the planetary carrier pins 33A while being in contact with both the sun rotor 14A and the eccentric shaft 21A.

As described above, the eccentric shaft 21A of the speed reducer 1A according to the present preferred embodiment slowly rotates in the direction opposite to the direction in which the input shaft member 10A and the sun rotor 14A rotate through the planetary rolling elements 26A due to power by the input shaft member 10A including the sun rotor 14A. Each planetary rolling element 26A of the speed reducer 1A is arranged to radially overlap with the eccentric shaft 21A including the internal ring. This contributes to reducing the axial dimension of the speed reducer 1A.

Figure 4:
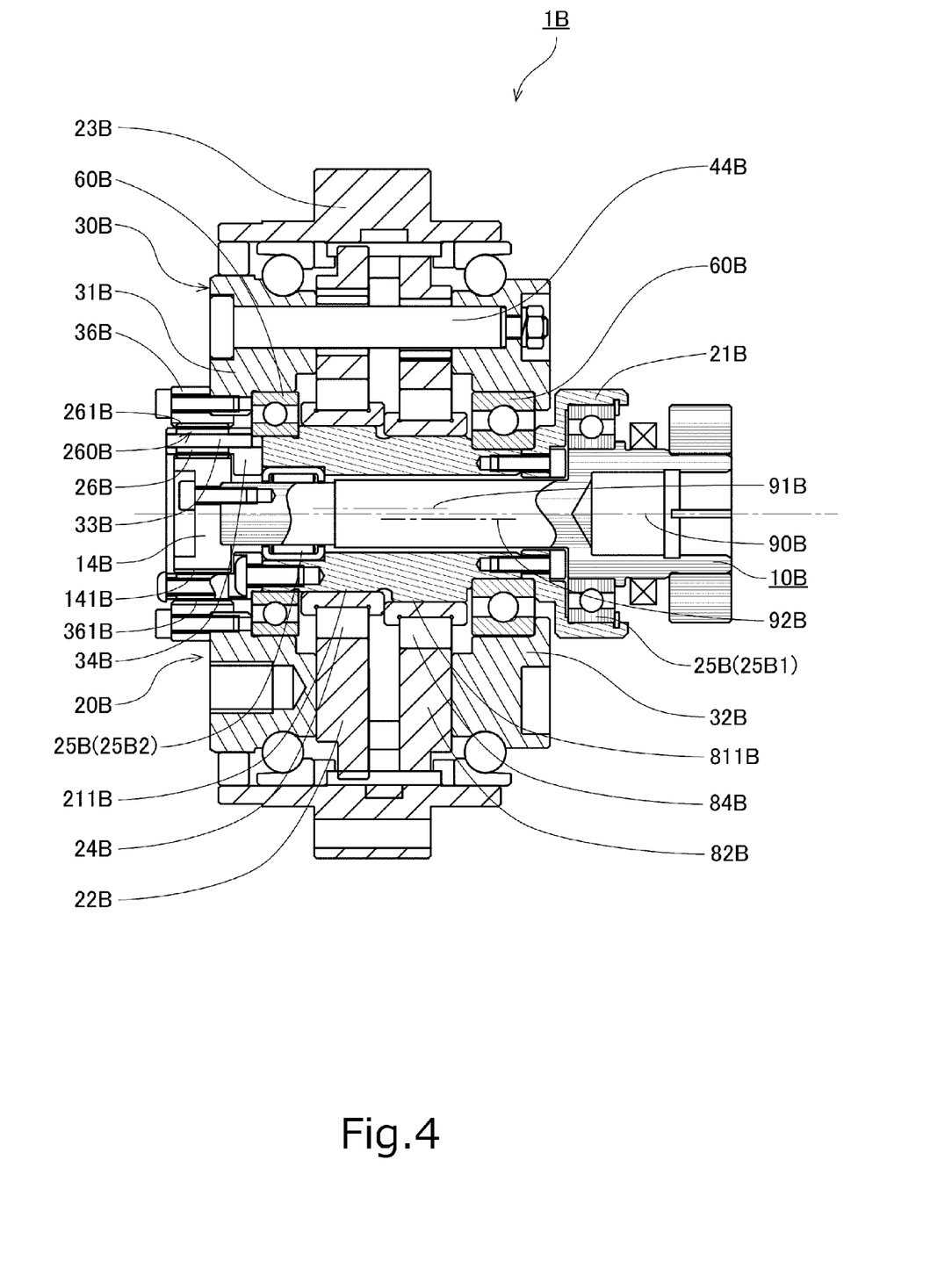
FIG. 4 is a vertical sectional view of a speed reducer according to another preferred embodiment of the present invention.

Next, a second preferred embodiment of the present invention will now be described below. FIG. 4 is a vertical sectional view of a speed reducer 1B according to the second preferred embodiment of the present invention taken along a plane including a central axis 90B. Note that the second preferred embodiment will be described below with focus on differences from the first preferred embodiment, and that features of the second preferred embodiment which are shared by the first preferred embodiment will not be described to avoid redundancy.

As illustrated in FIG. 4, a portion of the speed reducer 1B according to the second preferred embodiment in the vicinity of the central axis 90B projects to the output side. More specifically, a sun rotor 14B, a plurality of planetary rolling elements 26B, and an internal ring 36B are arranged to project to the output side relative to a first disk 31B of an output flange 30B. The speed reducer 1B having the above structure is also able to achieve reductions in the axial dimensions of the speed reducer 1B and a device as a whole to which the speed reducer 1B is attached, when the internal ring 36B, which is arranged radially outward of the planetary rolling elements 26B, is buried in the device.

Similarly to the speed reducer 1A according to the first preferred embodiment, the speed reducer 1B according to the present preferred embodiment includes an input shaft member 10B, a speed reduction mechanism 20B, and the output flange 30B. Once a motor is driven, the input shaft member 10B, which includes the sun rotor 14B, rotates about the central axis 90B at a first rotation rate, which is a rotation rate inputted from an outside. The speed reduction mechanism 20B includes the planetary rolling elements 26B, an eccentric shaft 21B, a plurality of eccentric oscillating gears (a first eccentric oscillating gear 22B and a second eccentric oscillating gear 82B), the internal ring 36B, and a housing 23B.

The planetary rolling elements 26B are arranged at regular intervals around the sun rotor 14B. Each planetary rolling element 26B includes an insert hole 260B in a center thereof. A planetary carrier pin 33B is inserted in the insert hole 260B. Each planetary rolling element 26B is supported by the planetary carrier pin 33B to be capable of rotating and revolving. A planetary carrier 34B including the planetary carrier pins 33B is fixed to the eccentric shaft 21B, which will be described below. In addition, an outer circumferential portion of each planetary rolling element 26B includes a plurality of planetary teeth 261B arranged to mesh with sun teeth 141B of the sun rotor 14B. Thus, the rotation of the sun rotor 14B at the first rotation rate causes each planetary rolling element 26B to revolve around the central axis 90B at a second rotation rate lower than the first rotation rate in the same direction as a direction in which the input shaft member 10B and the sun rotor 14B rotate. Note that the planetary rolling elements 26B may alternatively be arranged at irregular intervals around the sun rotor 14B.

The eccentric shaft 21B is a tubular member including an outer circumferential surface which is eccentric with respect to the central axis 90B. Due to the revolution of the planetary rolling elements 26B around the central axis 90B, the eccentric shaft 21B receives power through the planetary carrier 34B, and rotates about the central axis 90B at the second rotation rate in the same direction as the direction in which the input shaft member 10B and the sun rotor 14B rotate.

In addition, a plurality of second bearings 25B are arranged radially between an inner circumferential surface of the eccentric shaft 21B and the input shaft member 10B. This contributes to increasing precision with which each member of the speed reducer 1B is arranged. This in turn contributes to stabilizing rotation of the eccentric shaft 21B, and reducing wear and damage of each member, and also contributes to extending the life of the speed reducer 1B.

At least one of the plurality of second bearings 25B (a second bearing 25B1 in FIG. 4) is preferably a ball bearing. In the case where the "helical gear" is used as each of the planetary rolling elements 26B as described above, an axial load occurs. In this case, use of the ball bearing leads to easier absorption of the axial load. In addition, at least one of the second bearings 25B (a second bearing 25B2 in FIG. 4) is preferably a needle bearing. This contributes to reducing the radial dimension of the speed reducer 1B.

The internal ring 36B is a member in the shape of a circular ring, including a contact surface arranged to make contact with the planetary rolling elements 26B, and arranged radially outward of the planetary rolling elements 26B. The internal ring 36B is fixed to the output flange 30B. In addition, the internal ring 36B includes a plurality of internal teeth 361B arranged to mesh with the planetary teeth 261B in an inner circumferential portion thereof. Each of the planetary rolling elements 26B constantly meshes with both the sun teeth 141B of the sun rotor 14B and the internal teeth 361B of the internal ring 36B.

The first eccentric oscillating gear 22B is attached to an eccentric outer circumferential surface 211B of the eccentric shaft 21B through a first bearing 24B. Therefore, the first eccentric oscillating gear 22B is supported to be rotatable about a first central axis 91B, which is a center of the eccentric outer circumferential surface 211B of the eccentric shaft 21B. Similarly, the second eccentric oscillating gear 82B is attached to an eccentric outer circumferential surface 811B of the eccentric shaft 21B through a first bearing 84B. Therefore, the second eccentric oscillating gear 82B is supported to be rotatable about a second central axis 92B, which is a center of the eccentric outer circumferential surface 811B of the eccentric shaft 21B.

The output flange 30B includes the first disk 31B, a second disk 32B, and a plurality of eccentric oscillating carrier pins 44B arranged to pass through the eccentric oscillating gears (i.e., the first and second eccentric oscillating gears 22B and 82B) in the axial direction. Accordingly, rotation of the eccentric oscillating gears (i.e., the first and second eccentric oscillating gears 22B and 82B) causes power to be transferred to the output flange 30B through the eccentric oscillating carrier pins 44B.

Further, third bearings 60B are arranged radially between the eccentric shaft 21B and the first and second disks 31B and 32B of the output flange 30B. This contributes to further increasing the precision with which the output flange 30B is arranged in the speed reducer 1B. This in turn contributes to stabilizing rotation of the output flange 30B, and further reducing the wear and damage of each member, and also contributes to further extending the life of the speed reducer 1B, as is similarly the case with the first preferred embodiment.

As illustrated in FIG. 4, at least one of the third bearings 60B is preferably arranged to axially overlap with at least one of the second bearings 25B. This makes it easier to align centers of rotation thereof with each other. Moreover, a reduction in the thickness of the eccentric shaft 21B can thus be achieved, which contributes to reducing the radial dimension of the speed reducer 1B.

As described above, in the present preferred embodiment, the internal ring 36B and the output flange 30B, which are fixed to each other, receive power through the planetary rolling elements 26B and the eccentric oscillating carrier pins 44B. Accordingly, the internal ring 36B and the output flange 30B revolve around the central axis 90B at a third rotation rate lower than the second rotation rate in a direction opposite to the direction in which the input shaft member 10B and the sun rotor 14B rotate.

While preferred embodiments of the present invention have been described above, it will be understood that the present invention is not limited to the above-described preferred embodiments.

Note that the detailed shape of each speed reducer may be different from the shape thereof as illustrated in the accompanying drawings of the present application.

Preferred embodiments of the present invention are applicable to speed reducers.

Features of the above-described preferred embodiments and the modifications thereof may be combined appropriately as long as no conflict arises.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A speed reducer comprising:
   an input shaft member including a sun rotor arranged to rotate about a central axis;
   one or more planetary rolling elements each of which is supported to be capable of rotating around the sun rotor;
   a tubular eccentric shaft including an outer circumferential surface eccentric with respect to the central axis, and arranged to rotate about the central axis along with the rotation of the one or more planetary rolling elements;
   an eccentric oscillating gear including a plurality of external teeth in an outer circumferential surface thereof, and supported by the eccentric shaft through a first bearing;
   a housing including internal teeth arranged to mesh with the external teeth of the eccentric oscillating gear in an inner circumferential surface thereof;
   an output flange arranged to rotate about the central axis together with the eccentric oscillating gear, and including an eccentric oscillating carrier pin arranged to pass through the eccentric oscillating gear in an axial direction;
   one or more second bearings arranged radially between an inner circumferential surface of the eccentric shaft and the input shaft member; and
   one or more third bearings arranged radially between the eccentric shaft and the output flange.

2. The speed reducer according to claim 1, wherein each of the one or more planetary rolling elements is arranged to rotate by receiving power from the sun rotor while being in contact with both the sun rotor and the eccentric shaft.

3. The speed reducer according to claim 1, wherein at least one of the one or more second bearings is arranged to axially overlap with at least one of the one or more third bearings.

4. The speed reducer according to claim 1, wherein
   each of the one or more planetary rolling elements is a helical gear; and
   at least one of the one or more second bearings is a ball bearing.

5. The speed reducer according to claim 1, wherein at least one of the one or more second bearings is a needle bearing.

6. The speed reducer according to claim 1, wherein the one or more planetary rolling elements are arranged to radially overlap with the eccentric shaft.

7. The speed reducer according to claim 1, wherein at least one of the one or more second bearings is arranged to radially overlap with the eccentric outer circumferential surface of the eccentric shaft.

8. The speed reducer according to claim 1, further comprising:
   a carrier including a carrier pin or pins arranged to support the one or more planetary rolling elements; and an internal ring in a shape of a circular ring, including a contact surface arranged to make contact with the one or more planetary rolling elements, and arranged radially outward of the one or more planetary rolling elements; wherein the eccentric shaft is arranged to receive power from the one or more planetary rolling elements through the internal ring;

the carrier is fixed to the output flange; and the input shaft member and the eccentric shaft are arranged to rotate about the central axis in opposite directions.

9. The speed reducer according to claim 1, further comprising:

a carrier including a carrier pin or pins arranged to support the one or more planetary rolling elements; and an internal ring in a shape of a circular ring, including a contact surface arranged to make contact with the one or more planetary rolling elements, and arranged radially outward of the one or more planetary rolling elements; wherein the carrier is fixed to the eccentric shaft;

the eccentric shaft is arranged to receive power through the carrier; and the input shaft member and the eccentric shaft are arranged to rotate about the central axis in a same direction.

* * * * *